Oct. 11, 1927.
W. G. O'BRIEN
1,645,068
MACHINE FOR MAKING A FIBER COMPOSITION
Filed Oct. 2, 1922          3 Sheets-Sheet 1
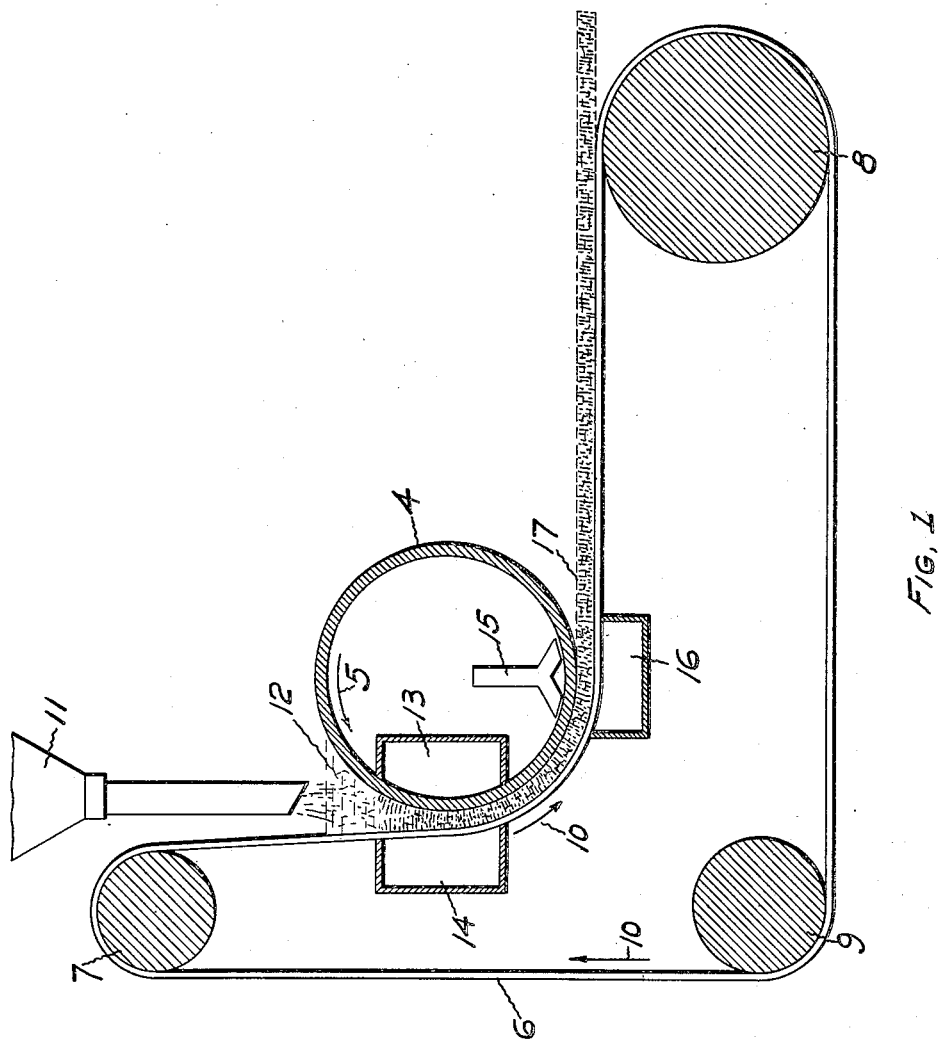
INVENTOR
WILLIAM G. O'BRIEN
BY
ATTORNEY

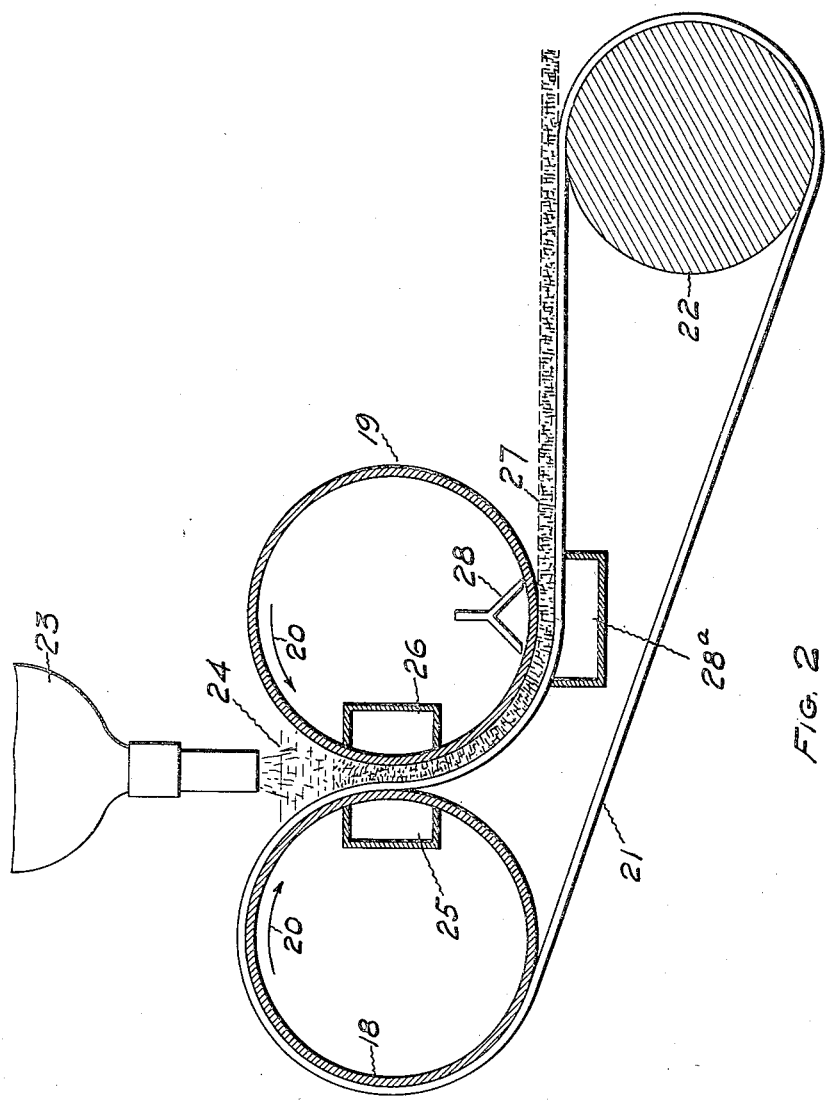

Oct. 11, 1927.
W. G. O'BRIEN
1,645,068
MACHINE FOR MAKING A FIBER COMPOSITION
Filed Oct. 2, 1922   3 Sheets-Sheet 3
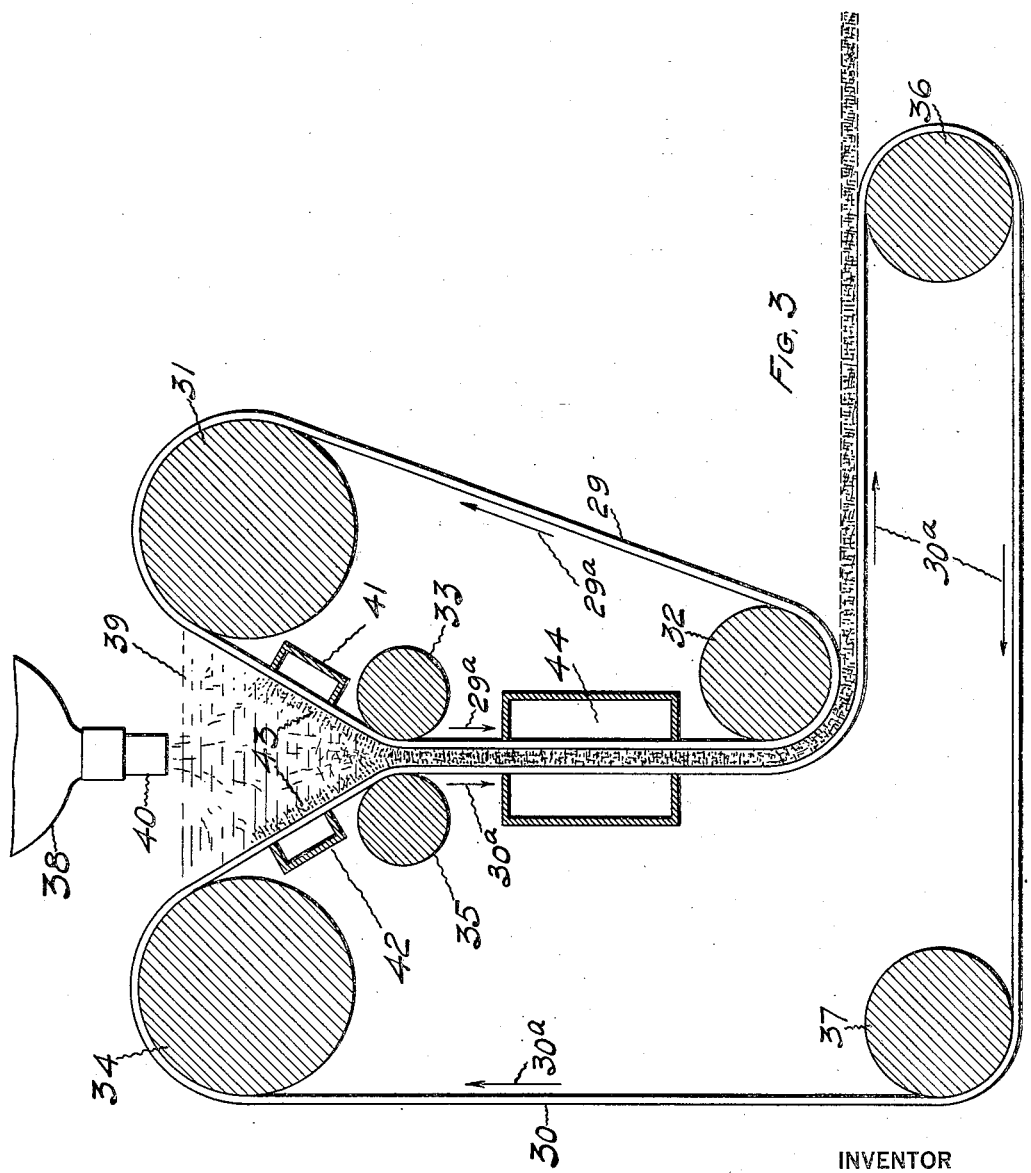
INVENTOR
WILLIAM G. O'BRIEN
BY
ATTORNEY Patented Oct. 11, 1927.

1,645,068

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

MACHINE FOR MAKING A FIBER COMPOSITION.

Application filed October 2, 1922. Serial No. 591,955.

My invention relates to machines for making a fiber composition and it has particular relation to machines of the Fourdrinier type, commonly used in the manufacture of paper.

The object of my invention is to provide a novel machine of the above designated type which is particularly adapted for making a fibrous material in which the fibers are disposed normally to the wearing surface of the material.

In the accompanying drawings Fig. 1 is a sectional view of one form of machine constructed in accordance with my invention;

Fig. 2 is a sectional view of another form which my invention may assume; and

Fig. 3 is a similar view of a third form of my invention which may be employed.

In the Fig. 1, I show an annular porous member 4 which is adapted to be rotated in the direction indicated by the arrows 5, by a power driven means, not shown. The annular member 4 is composed of a wire screen of extremely fine mesh stretched over an annular supporting framework which is omitted, on the drawing, for the sake of clarity. Cooperating with the annular member 4 is an endless conveyor belt 6, which is porous and may, if desired, be composed of a wire screen of extremely fine mesh, as commonly used in the Fourdrinier machines. The screen 6 passes over an upper pulley 7, over the outer surface of the annular member 4, over an end pulley 8, and back over a pulley 9 to the pulley 7. The carrier member 6 is driven from either of the pulleys 8 or 9, as may be desired, it being essential, however, that the speed of the carrier 6 be exactly the same as that of the annular member 4 for a reason to be hereinafter pointed out. The direction of movement of the carrier 6 is indicated by arrows 10. The carrier 6 and the annular member 4 are so disposed that the carrier belt 6 tends to engage the annular member 4 over approximately 90° of its circumference.

A quantity of fibers, suspended in water or other suitable liquid, are stored in a container 11, and are drained therefrom through a conduit to a chamber 12, of which a portion of the annular member 4 and the carrier belt 6 form two oppositely disposed side walls. The remaining two side walls of the container into which the fibers and liquid are admitted are stationary. The liquid is drawn through the annular member 4 and the carrier belt 6, both of which are porous, by means of a vacuum producing mechanism 13 disposed in engagement with the inner surface of the member 4 and a similar vacuum producing mechanism 14, in engagement with the belt 6. As the liquid is drawn through the members 4 and 6 by the vacuum producing members 13 and 14, the fibers tend to follow, but are prevented from doing so by the screens 4 and 6. The fibers therefore align themselves on the screen members 4 and 6 in the direction followed by the liquid in passing therethrough, forming a fibrous material, as indicated at 17. On account of the fact that both of these walls are perpendicular or substantially so, the liquid travels in substantially a horizontal plane in passing therethrough, and the fibers are deposited in planes substantially perpendicular to the surfaces of the members 4 and 6.

After the material has been carried beyond the vacuum producing members 13 and 14 by the movement of the belt 6, it passes between a spraying device 15 and an oppositely disposed cooperating vacuum producing mechanism 16. The spraying device 15 may be used to spray any desired liquid on the fibrous material as it passes. In carrying out my invention, I prefer to use rubber coated fibers. When such fibers are employed, the device 15 is preferably employed to spray a rubber precipitant on the material. This precipitant serves to displace any solvent which may remain in the rubber. The suction producing device 16 removes any excess precipitant and any solvent which may be displaced by the precipitant, permitting the material to move on in a comparatively dry condition. If desired, the spraying device 15 may be employed to introduce a binding material to the fibrous material.

After passing the spraying device 15, the fibrous material is carried away from the roller 4 by means of the belt 6, a portion of which extends at right angles to the main body portion thereof.

The structure illustrated in Fig. 2 differs from that shown in Fig. 1, in that two oppositely disposed annular members 18 and 19 are provided, which move in the directions indicated by arrows 20. An endless carrier belt 21 passes over the annular member 18 and engages the annular member 19, extending over that portion of the member 19 which is adjacent to the member 18 and also over the lowermost portion thereof. After leaving the member 19, the belt passes over an idler pulley 22, and back to the roller member 18.

The annular members 18 and 19, and also the carrier member 21, are porous in order to permit the passage of liquids therethrough, as described in connection with Fig. 1. A quantity of fibers suspended in a liquid in a tank 23 are admitted by means of a conduit to a chamber 24, disposed between the members 18 and 19, a portion of each of which constituting a side wall of the chamber 24.

A vacuum producing means 25 cooperates with the annular member 18, as does a vacuum producing means 26 cooperate with the annular member 19, to remove therethrough the liquid in which the fibers are suspended. The fibers are disposed perpendicular to the belt 21 and the annular member 19 as indicated in the drawing. The material formed by the fibers, as indicated at 27, is moved by means of the belt 21 to a position beneath a spraying device 28 which cooperates with a suction producing device 28ª to wash the material passing through, if it is so desired, and to remove any other displaced liquid therefrom, as described in connection with Fig. 1.

In the form of my invention illustrated in Fig. 3 the annular members of Fig. 2 are displaced by endless carrier belts 29 and 30, both of which are composed of a porous non-soluble material. The belt 29 passes over an upper pulley 31, over the lowermost pulley 32 and over an intermediately disposed pulley 33. That portion of the belt between the pulleys 32 and 33 is substantially vertical, whereas the portion thereof between the pulleys 31 and 33 is inclined with respect to the vertical. The direction of movement of the belt is indicated by an arrow 29ª. The belt or carrier member 30 passes over an upper pulley 34, an intermediately disposed pulley 35, and enters into engagement with the belt 29 as it passes over the pulley 33, over an end pulley 36, and an idling returning pulley 37. The direction of movement of the belt 30 is indicated by arrows 30ª.

A quantity of fibers are suspended in a liquid disposed in a tank 38 and are admitted to a chamber 39 by means of a conduit 40. The inclined portions of the carrier belts 29 and 30 constitute oppositely disposed side walls of the liquid container 39. A vacuum producing device 41 is disposed in engagement with the inclined portion of the belt 29, and similarly, a vacuum producing mechanism 42 is disposed in engagement with the inclined portion of the belt 30. These vacuum producing mechanisms draw the liquid through the porous belts 29 and 30 and cause the fibers to align themselves perpendicular with respect to the belts 29 and 30, as indicated at 43. When the belts 29 and 30 pass over the pulleys 33 and 35 respectively, the two sets of fibers intermesh and form a single compact mass of material having the fibers disposed perpendicular to the belts.

After the fibers have been gathered together by means of the mechanism described, they are carried by the belts 29 and 30 into a chamber 44 in which, if so desired, they may be sprayed with a washing or displacing liquid, and subsequently dehydrated by means of a vacuum producing mechanism, as described in connection with the structure illustrated in Fig. 1. The fibrous material is then carried between the belts 29 and 30, over the horizontally disposed portion of the belt 30 to the pulley 36, from which the material passes to a subsequent manufacturing operation.

The members 4 and 6 in Fig. 1; 18, 19 and 21 in Fig. 2; and 29 and 30 in Fig. 3, may be driven from any desired source, but it is absolutely essential that they be driven at the same rates of speed, or the fibers held therebetween will be broken and the felted arrangement thereof will be seriously interfered with.

Although I have shown several forms of my invention and have described in detail several applications thereof, it will be obvious to those skilled in the art that it is not so limited but that various minor changes and modifications may be made therein without departing from the spirit of my invention or from the scope of the appended claim.

What I claim is:

A machine for forming continuous sheets of felted rubberized material, comprising a foraminous cylinder having a suction box extending therewithin and adapted to apply suction to the wall of the cylinder, a spray device adapted to spray a rubber precipitant, projecting into the cylinder below the suction box, drums associated with the cylinder, an endless foraminous belt passing beneath the cylinder and encircling the drums, said belt having a horizontal portion for transporting the felted material and an inclined portion adjacent the suction box and on which the mat is formed, tangent to the cylinder and means for discharging rubberized pulp between the cylinder and the belt.

In witness whereof, I have hereunto signed my name.

WILLIAM G. O'BRIEN.